United States Patent [19]

Sheu

[11] Patent Number: 4,967,815

[45] Date of Patent: Nov. 6, 1990

[54] TOUCH-CONTROLLED SWITCH FOR ELECTRICAL PNEUMATIC VACUUM FLASK

[76] Inventor: Jin-Yuh Sheu, 1-2 Th Fl., 25, sec 3, Ren Ay Rd., Taipei, Taiwan

[21] Appl. No.: 398,723

[22] Filed: Aug. 25, 1989

[51] Int. Cl.$^5$ .............................................. B65B 1/04
[52] U.S. Cl. .............................. 141/360; 200/61.58 R; 200/332
[58] Field of Search ................ 417/316; 141/360, 362; 200/332, 61.58 R, 61.6, 61.62, 61.7, 61.86

[56] References Cited

U.S. PATENT DOCUMENTS

| | | | |
|---|---|---|---|
| 4,037,994 | 7/1977 | Bird | 417/316 |
| 4,116,246 | 9/1978 | Franzen | 141/362 |
| 4,166,939 | 9/1979 | Switzer | 200/332 |
| 4,209,999 | 7/1980 | Falk | 141/362 |

Primary Examiner—Gerald P. Tolin
Attorney, Agent, or Firm—Dvorak and Traub

[57] ABSTRACT

A touch-controlled switch for electrical pneumatic vacuum flask, including a switch plate with which a glass or the like contacts, a gutter connected to an air cavity, a venting tube connected to the gutter, a fine switch disposed in a lid of the vacuum flask, and a touch rod disposed under the fine switch and fixedly inserted in a top portion of the vacuum flask. A spring is fitted to the touch rod, whereby when using one hand to hold a glass or the like and press the same against the switch plate, a sealing rod formed therebehind will seal an outlet of the venting tube to kept the air contained in an internal vessel tightly enclosed therein. A lateral projection is formed on the sealing rod for lifting the touch rod to touch the fine switch and consequently activate a motor to pump air into the internal vessel for discharging water therefrom. When removing the glass from the switch plate, the touch rod is descended via extending force of the spring and separated from the fine switch to stop discharging water. Furthermore, the switch plate is downward pressed by the touch rod, permitting the sealing rod to leave the outlet of the venting tube and allow air contained in the internal vessel to escape therefrom.

4 Claims, 2 Drawing Sheets

TOUCH-CONTROLLED SWITCH FOR ELECTRICAL PNEUMATIC VACUUM FLASK

BACKGROUND OF THE INVENTION

There are several preceding inventions related to electrical pneumatic vacuum flask as follows: U.S. application Nos. 332, 092; 459, 807; 665, 435; 798, 668; 384, 054; and 629, 351 which have been granted as U.S. Pat. Nos. 3,825,156; 3,905,520; 4,060,182; 4,116,366; 4,517,445; and 4,512,246, respectively. (Please refer to copies of U.S. Patent Publications attached hereto.) The above electrical or manual vacuum flasks all include button switches or pressing lids which are not disposed adjacent to the spouts and therefore, the water contained therein must be discharged by means of turning on the switch or pressing the lid with one hand.

In case of a button switch (such as U.S. application No. 798,668), the motor 14 will be activated right after pressing the button switch, making the pump 11a vertically reciprocate to pump air into the internal vessel 1. simultaneously, the electromagnet is powered on to lower the lever 22 and seal the vent for discharging the water.

In case of a pressing lid (such as U.S. application No. 459,807), the lid 18 is pressed to consequently press the upper cover 17 and seal the vent 14 of the pump cover 27. In this position, by means of further pressing the lid 18, the pump 10 will pump air into the internal vessel for discharging the water.

The abore-mentioned pneumatic vacuum flask of button switch type can discharge water only by precedingly turning on the switch and then placing a glass or the like under the spout for receiving water. Therefore, respecting this type of vacuum flask, water can not be acquired by directly using a glass to touch the switch. As to the vacuum flask of pressing lid type, two hands are required to discharge the water and thus this type of vacuum flask is more inconvenient to a user.

SUMMARY OF THE INVENTION

It is an object of the present invention to provide a touch-controlled switch for electrical pneumatic vacuum flask, and particularly to provide an improved switch for vacuum flask, wherein the water can be discharged only by holding a glass and contacting the glass with the switch. The switch primarily includes a pressing plate switch capable of activating a motor when in contact with a glass or the like, a gutter connected to front end of on air cavity, a venting tube connected to front end of the gutter, a fine switch and a touch rod located under the fine switch, whereby when the pressing plate switch is pressed by a glass, a sealing rod disposed thereafter will seal the venting tube to tightly enclose air contained in an intetnal vessel, and furthermore, a projection laterally formed on the sealing rod can life the touch rod to touch the fine switch to further activate a motor and pump air into the intermal vessel for discharging the water contained therein. through the following description and the companying drawings wherein:

DETAILED DESCRIPTION OF THE PREFERRED EMBODIMENT

Figure 1:
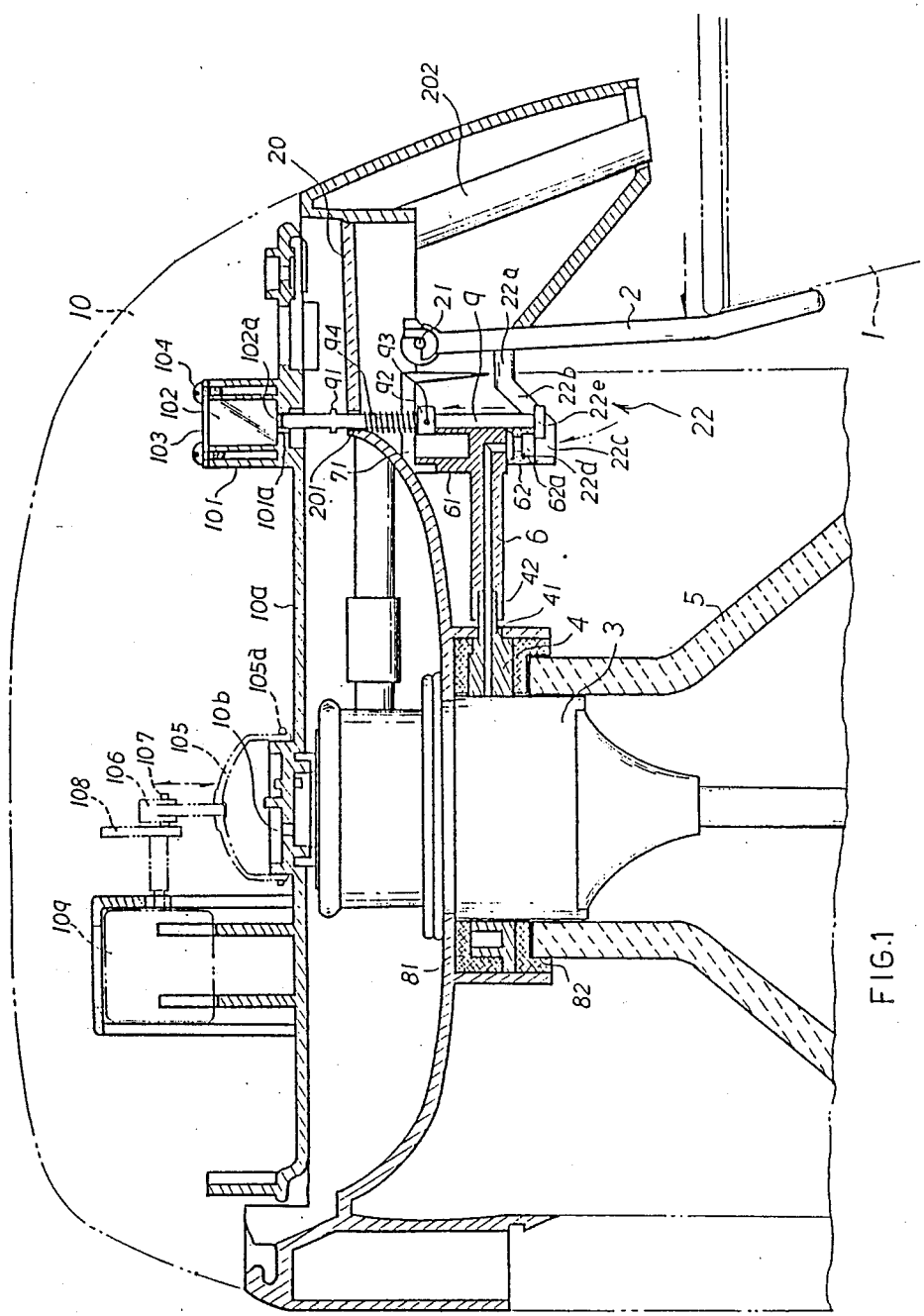
FIG. 1 is a longitudinal sectional view of the present invention, showing the pressing plate switch pressed by a glass.

Please refer to FIG. 1, which shows a sectional view of the present invention. The present invention includes a switch plate 2 pivoted on a pivot 21. A user can hold a glass 1 and press the glass 1 against the plate switch 2.

A sealing rod 22 is disposed behind the plate switch 2, having a horizontally extending portion 22a, a slantly downward extending portion 22b, and an end horizontally extending portion 22c. The end horizontally extending portion 22c is formed with an upper tenon 22d and a lateral projection 22e.

A retainer ring 4 is disposed around an air cavity 3 arranged inside the vacuum flask. A gutter 41 is connected to the retainer ring 4. A small diameter portion 42 is formed at front end of the gutter 41. The other end of the gutter 41 is communicated with the air cavity 3. The air contained in an internal vessel 5 can flow into the air cavity 3 via an inlet and flow through the gutter 41 and into a venting tube 6.

At its one end is the venting tube 6 connected to the gutter 41, while at its other end is the venting tube formed with a column portion 61. The column portion 61 is fixed under a base block 71 and is kept stationary. A cork plug 62 is affixed under the column portion 61, having a □- shaped recess 62a which is corresponding to the projiction 22e of the sealing rod 22 whereby the projection 22e can be plugged into the recess 62a to seal the venting tube 6, keeping the air contained in the internal vessel 5 tightly enclosed therein.

The air cavity 3 is disposed above the internal vessel 5 and two rubber gaskets 81, 82, are respectively located above and below the retainer ring 4 to avoid leakage of air.

Additionally, on the bottom 10a of a lid 10 are disposed a valve inlet 10b and a base 101 having a small hole 101a. A fine switch 102 is disposed in the base 101. The fine switch 102 has a touch needle 102a inserted into the small hole 101a. A cap 103 is secured above the fine switch 102 via screws 104.

A rubber pump cover 105 is mounted above the valve inlet 10b. The bottom periphery of the pump cover 105 is fixed by a coil 105a. A reciprocating lever 106 is arranged above the pump cover 105. The reciprocating lever 106 is pivoted to the surface of a cam member 108 by a pivot 107. The cam member 108 is rotated by a motor 109 to vertically reciprocate the pump cover 105 and pump air into the internal vessel 5.

A touch rod 9 is provided with its lower end disposed on projection 22e of the switch plate 2 and its upper end extending through an opening 201 of the top 20 of the vacuum flask and inserted into the small hole 101a of the base 101. Two lateral protrusions 91 are formed near upper end of the touch rod 9 and a fixing block 92 is pivoted to middle portion of the touch rod 9 by a pivot 93. A compression spring 94 is disposed between the fixing block 92 and the top 20 of the vacuum flask.

As shown in FIG. 1, a glass 1 is pressed against the switch plate 2 to backward rotate the plate switch 2, wherby the tenon 22d of the sealing rod 22 seals the cork plug 62 to keep the air contained in the venting tube 6 tightly enclosed therein.

Furthermore, the projection 22e of the sealing rod 22 will lift the touch rod 9 to contact the touch needle 102a of the fine switch 102 and power on the motor 109, whereby the pump cover 105 will pump air into the internal vessel 5 to increase pressure existing in the internal vessel 5 and force the water to flow out through a water tube 202.

Figure 2:
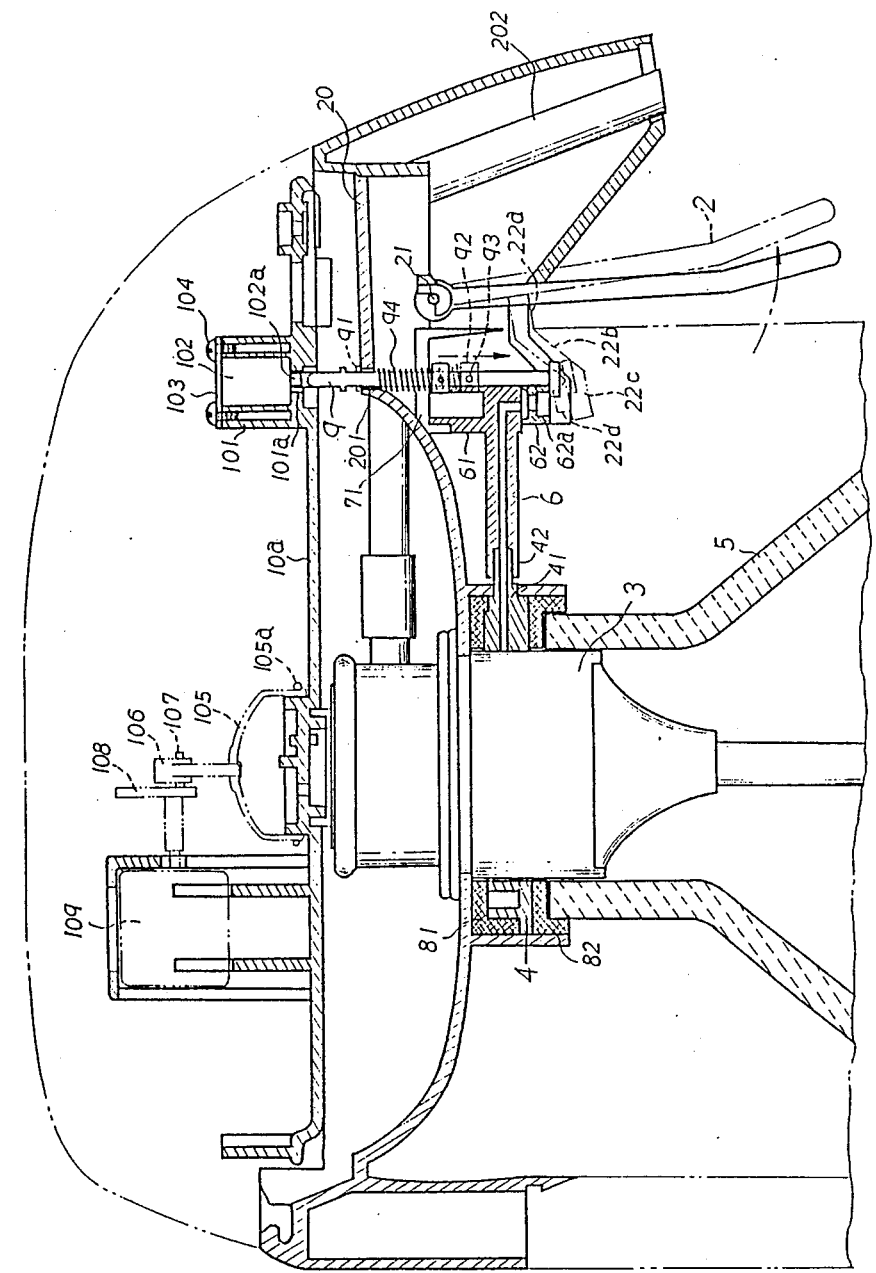
FIG. 2 is a sectional view according to FIG. 1, showing the pressing plate switch free from contact with the glass.

As shown in FIG. 2, if the glass 1 is removed from the switch plate 2, the touch rod 9 will be descended via extending force of the compression spring 94. Consequently, the upper end of the touch rod 9 is separated from the touch needle 102a of the fine switch 102 and the motor 109 is powered off. Simultaneously, the touch rod 9 will force the switch plate 2 to descend to separate the tenon 22d of the sealing rod 22 from the cork plug 62, permitting the air contained in the internal vessel 5 to be vented through the venting tube 6. In this position, water will not be discharged.

The present invention possesses the following advantages:

1. It is more bygienic to contact the plate switch with a lateral side of a glass or the than with the top edge thereof.
2. Many conventional elements such as electrical venting valve and electromagnet are eliminated, and thereby the cost is greatly lowered.
3. All wire design is arranged in the lid, whereby the circuit set between the fine switch and the motor can be facilitated without the complexity existing in conveniently practiced in accordance with the aforesaid arrangement.

I claim:

1. A touch- controlled switch with an electrical pneumatic vacuum flask, comprising a retainer ring secured around an air cavity in said flask, a gutter connected to said retainer ring, a venting tube connected to said gutter, a switch plate pivoted on a pivot, a sealing rod extending from said switch plate, a touch rod movable by said sealing rod, and a fine switch disposed above an actuable by said touch rod, said fine switch being fixed in a base located on a bottom of a lid of said vacuum flask.
2. A switch as claimed in claim 1, wherein said touch rod is formed with two lateral protrusions and a fixing block, a spring being further fitted to said touch rod.
3. A switch as claimed in claim 1, wherein said sealing rod has a front end formed with a tenon and a lateral projection.
4. A switch as claimed in claim 1, wherein two rubber gaskets are disposed respectively above and below said retainer ring.

* * * * *